Oct. 5, 1954  R. L. BEYERSTEDT  2,690,848
OSCILLATING BEAM TYPE CRAWLER-TRACTOR APPLIANCE
Filed Jan. 18, 1947  3 Sheets-Sheet 1

INVENTOR.
Ralph L. Beyerstedt
BY
Walter M. Fuller
atty.

Oct. 5, 1954 R. L. BEYERSTEDT 2,690,848
OSCILLATING BEAM TYPE CRAWLER-TRACTOR APPLIANCE
Filed Jan. 18, 1947 3 Sheets-Sheet 2
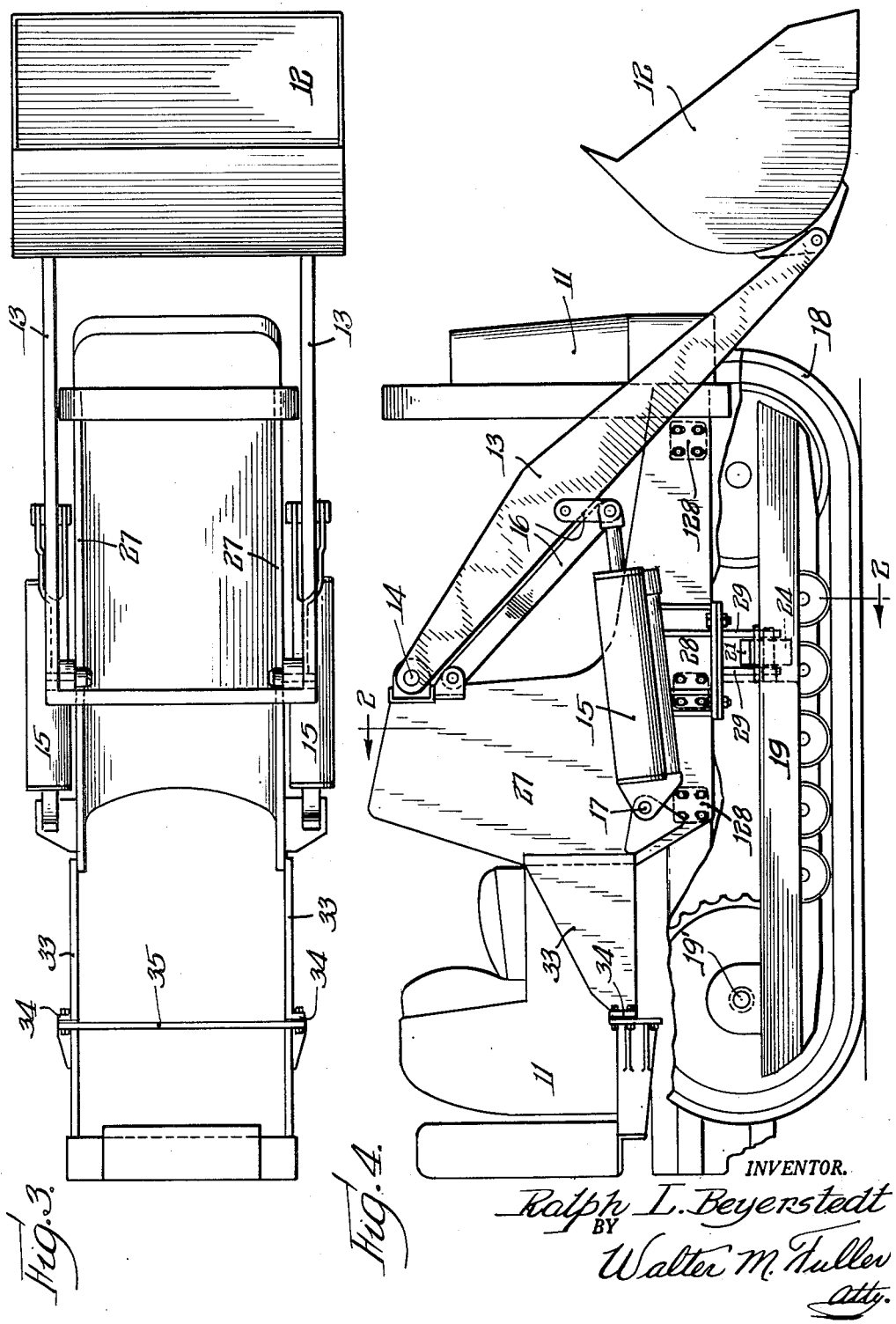
INVENTOR.
Ralph L. Beyerstedt
BY
Walter M. Fuller
Atty.

Oct. 5, 1954     R. L. BEYERSTEDT     2,690,848
OSCILLATING BEAM TYPE CRAWLER-TRACTOR APPLIANCE
Filed Jan. 18, 1947     3 Sheets-Sheet 3
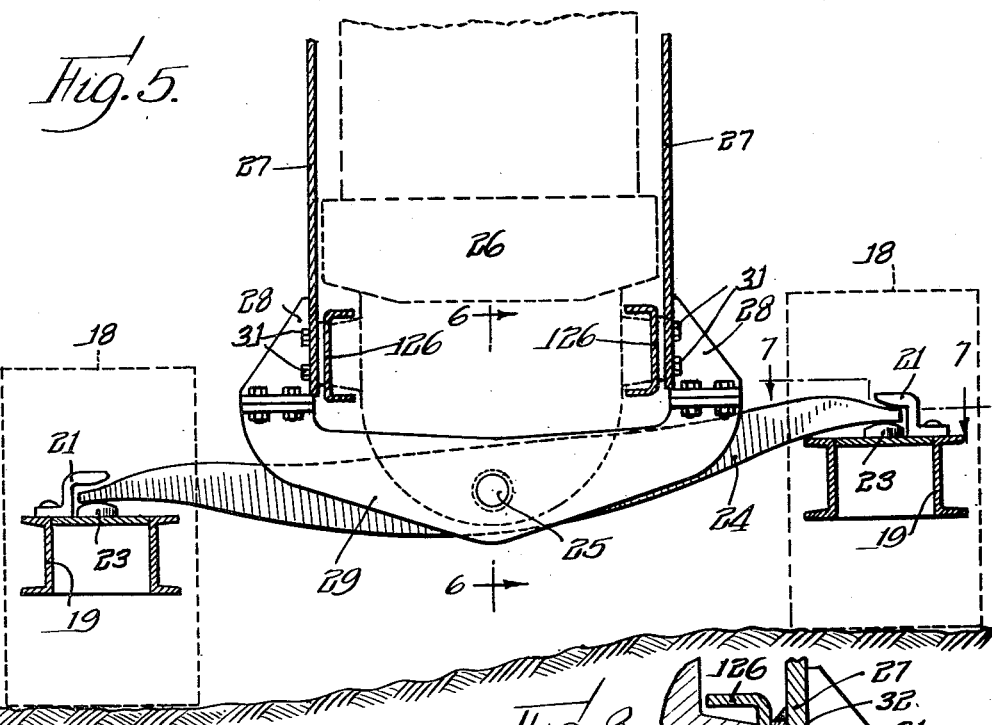
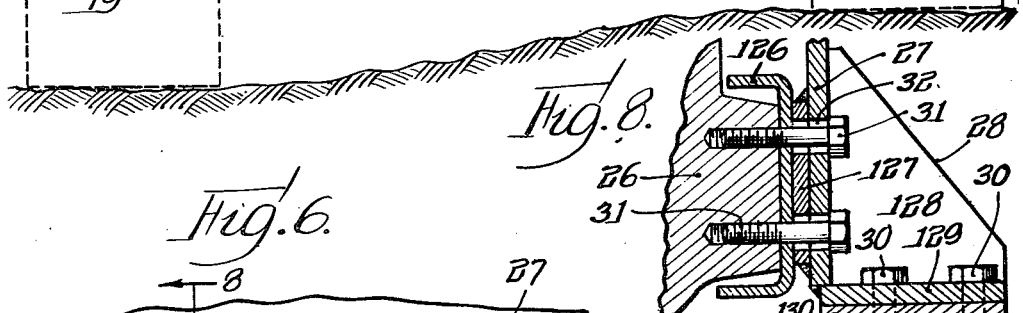
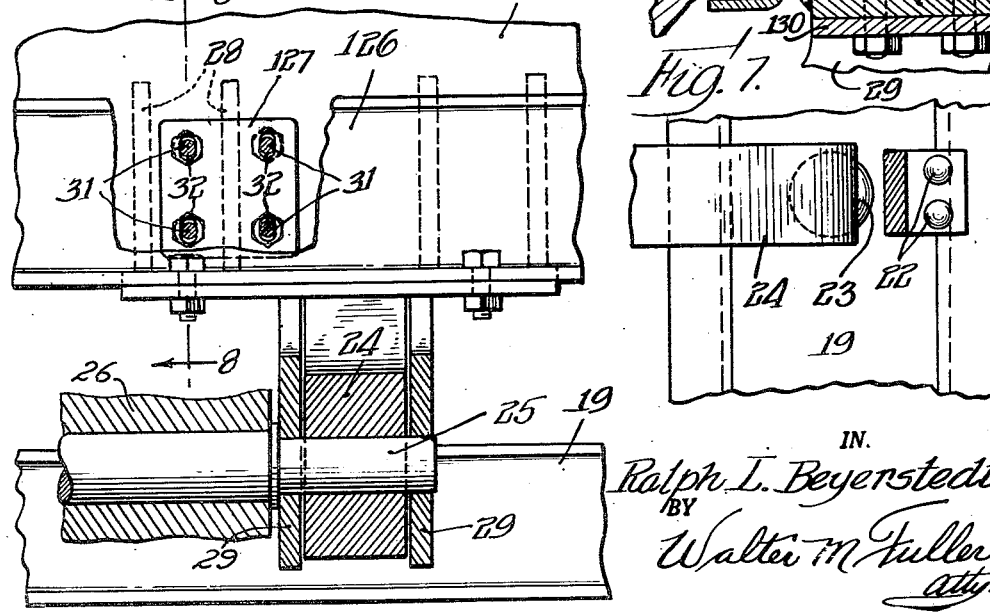
INVENTOR.
Ralph L. Beyerstedt
BY Walter M. Fuller
ATTY.

Patented Oct. 5, 1954

2,690,848

UNITED STATES PATENT OFFICE 2,690,848

OSCILLATING BEAM TYPE CRAWLER-TRACTOR APPLIANCE

Ralph L. Beyerstedt, Libertyville, Ill., assignor to The Frank G. Hough Co., Libertyville, Ill., a corporation of Illinois Application January 18, 1947, Serial No. 722,937

7 Claims. (Cl. 214—131)

Heretofore the conventional type of crawler-tractor has been designed and built with a multiple-leaf form of spring lying or positioned transversely across, and supported at its ends, on the pair of track or truck frames of the tractor, the purpose of such spring being to provide a cushion-member to sustain the engine and main-frame of the tractor and still supply the capacity for oscillation of the tracks.

Experience demonstrated to me that in this particular design or construction of tractor such cushioning feature has no pertinent advantage in that it may be noted that the only load the spring provides for is that of the tractor engine frame which accommodates the engine, hood, radiator and operator's cab.

In the past, an associated tractor appliance, such as a shovel, bulldozer, crane, etc., has been mounted directly on the side truck-frames of the tractor when the load was considered at all substantial, but, in doing this, elaborate and costly design was required in order to compensate for the oscillations of the tracks, or, the truck-frames were fastened together with a heavy non-flexible member to eliminate the oscillation, creating what is referred to in the trade as a rigid truck-frame, yet, in excluding the capacity for oscillation, valuable characteristics, such as the operator's comfort and traction, were sacrificed.

In analyzing and attempting to solve this long-standing problem, I detected, after much careful and detailed study, that the ideal method would be to mount the frame of the attachment, a shovel or bucket for instance, in this particular case, on the main-frame or body of the tractor and still retain the oscillating tractor feature.

To accomplish this highly desirable result proper provision should be made in whatever oscillating framework is used to support the tremendous vertical load created by the operation of the attachment, in this case, the shovel.

To transmit these loads through any part of the tractor-engine frame is practically prohibitive, and, therefore, it is impossible to interchange an oscillatory beam heavy enough to take the load for the specified spring-assembly as used on standard tractors.

The reason for this is that, with the shovel mounted on the outside of the tractor-engine main-frame and the load being finally taken by the oscillatory beam, the transfer of the load would have to go through certain parts of such tractor main-frame, but this was not permissible.

After careful study and analysis of all the related factors involved I discovered a satisfactory solution by mounting the shovel-frame on the oscillating beam and separately supporting the tractor-engine main-frame also on the oscillating beam.

In this way I was able to obtain very simply what other manufacturers had secured through very elaborate design and at the same time still maintain the possibility of track oscillation. In this way the shovel load is transmitted through side members of the frame to cradles and oscillatory beam and then to the side truck-frames of the tractor.

No vertical loads are transmitted through any part of the tractor-engine main-frame other than the weight and torque reaction of the tractor itself at a point where the cradles and oscillatory beam are attached.

An outstanding novel feature of this invention is the employment of simple supports which make it possible to provide a comparatively light-weight economical shovel having all of the advantages of anything now current in the field together with additional benefits as will be understood more fully from what follows.

In order that those acquainted with or skilled in this art may understand the current invention both from structural and functional standpoints, a present preferred embodiment of the invention has been illustrated in the drawings forming a part of this specification and this is followed by a full and complete description of such appliance.

Figure 1:
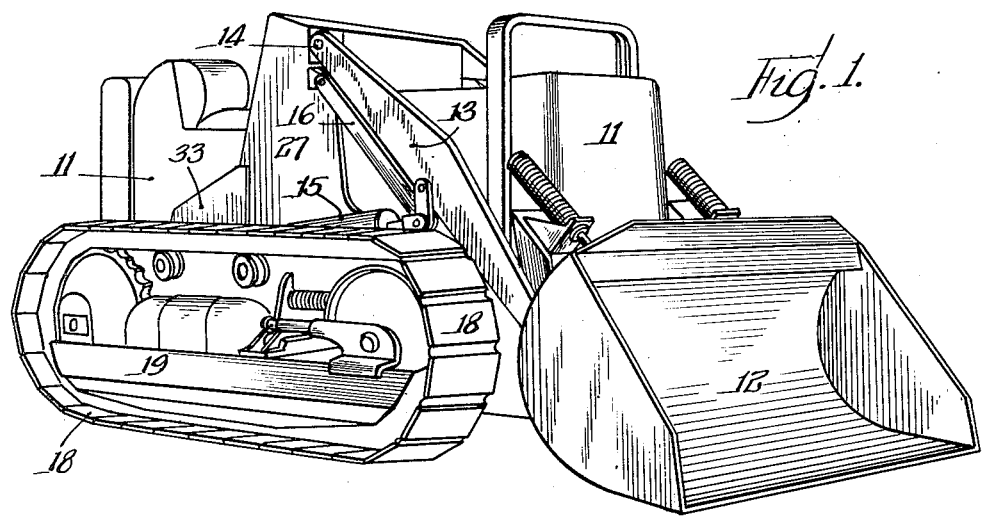
Figure 1 is a general perspective view of a crawler-tractor fitted with a suitable shovel and its operating means and embodying a transverse, oscillatory beam construction to facilitate the travel of the vehicle.
Figure 2:
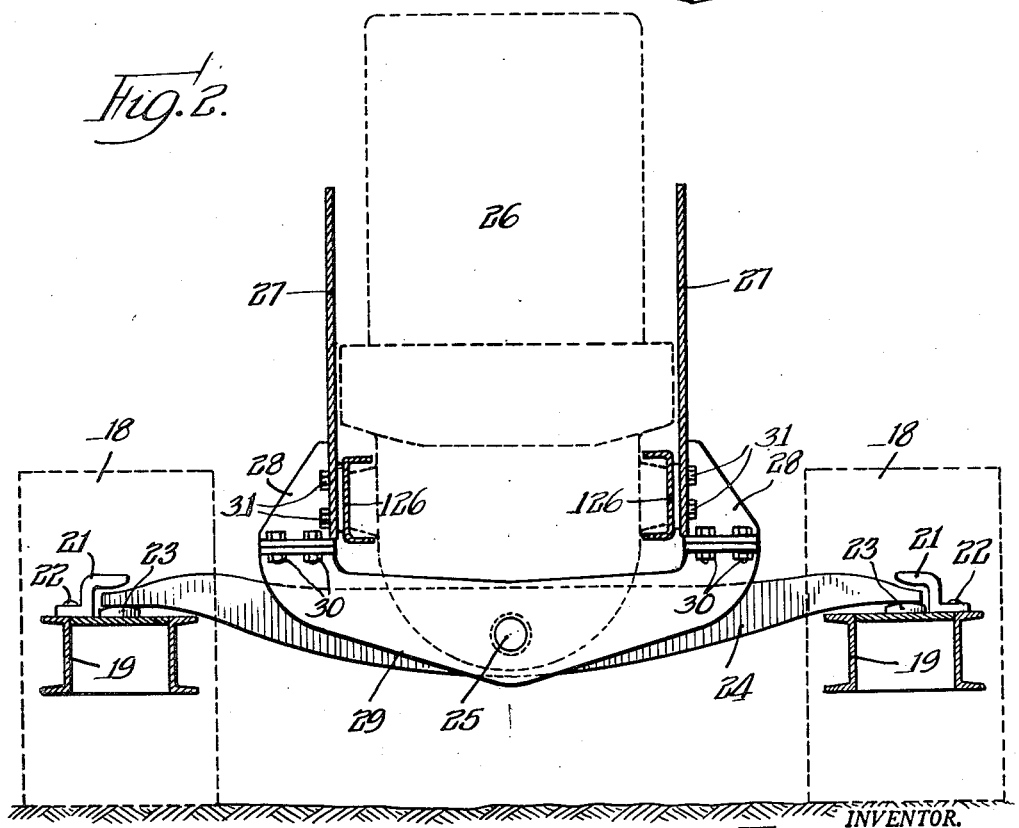
Figure 2 is a fragmentary, vertical cross-section through the portion of the appliance on the line 2—2 of Figure 4 with certain parts omitted.

Figure 3 presents a plan view of the construction;

Figure 4 portrays a side elevation of the appliance;

Figure 5 is similar to Figure 2 but with some of the elements occupying different positions;

Figure 6 is an enlarged, partial, vertical, longitudinal section on line 6—6 of Figure 5;

Figure 7 shows a fragmentary horizontal section on line 7—7 of Figure 5 on a larger scale; and Figure 8 presents a partial cross-section on line 8—8 of Figure 6.

By reference to the several views of these drawings, it will be readily perceived that the crawler-tractor, designated as a whole 11, is equipped with a suitable attachment of any appropriate type of appliance such, in the present case, as the shovel or bucket 12 rockingly mounted on the front end of a duplex boom 13, 13 fulcrumed on the tractor at 14, the shovel being releasably latched to the boom in load-retaining position by any appropriate means not fully illustrated because it is well known in the art.

Such boom and its shovel are raised and lowered by a pair of suitable hydraulic cylinders 15, 15 hinged on the tractor at 17 and having their piston-rods operatively connected through novel linkages 16 to the dual-boom 13, 13, such type of linkage forming the subject-matter of my co-pending patent application Serial No. 715,871, filed December 12, 1946, now Patent No. 2,444,692 granted July 6, 1948.

Each of the two, companion, power-driven crawler-mechanisms located at opposite sides of the apparatus, and which have been designated each as a whole 18, has, as is customary, a horizontal frame 19 oscillatable, as usual, about the rear axle 19', the two frames of which in vertical cross-section are shown in Figures 2 and 5.

At suitable, transversely registered points intermediate their lengths each of these corresponding bars or beams has an elevated metal retainer 21 mounted on its top, flat surface, as by screws or bolts 22, or otherwise, and beneath the raised portion of such part 21 there is also mounted on the bar or beam 19 a bearing block or member 23 with an appropriate rounded top surface.

Resting on such pair of elements 23, 23 at its opposite ends (Figs. 2, 5, 6) and thus supported by the two tractor-beams 19, 19 is a transverse, longitudinally-tapered bar or oscillator 24 rockingly mounted at its center on a stationary, forwardly extended stud or shaft 25 (Fig. 6) on the tractor-engine main-frame designated 26, including channel-bars 126, 126.

The main-frame of the shovel construction, supporting all of its weight as well as of the load in the shovel, includes the associated pair of side-plates 27, 27, (Figs. 2, 5, 6, 8) two brackets 28, 28 and the pair of parallel spaced-apart, upwardly curved bars or cradles 29, 29 all rigidly connected together in any approved manner and with such parts 29, 29 at their middle portions rockingly mounted on the stud-shaft 25, whereby the weight of all such portion of the shovel mechanism is directly imposed upon, and supported by, such shaft which transmits it, as well as its other tractor-engine main-frame load, onto the two tractor mechanisms 19, 18.

Each bracket 28 (Fig. 8) may have the inner upright edge of each of its upwardly tapered gusset-plates 128 in contact with and welded to the outer surface of the corresponding wall or plate 27 and its bottom edge welded to its lower horizontal plate 129 which is bolted at 30 or otherwise fixedly fastened to the companion horizontal plate portion 130 on the corresponding top end of the cradle 29.

In order that the load of the shovel mechanism may not be transmitted to or through any part of the engine construction or its frame, cap-screws 31, 31 extend through vertical slots or oversize holes 32 in the lower portions of the two walls 27, 27 and their reinforcements 127 welded to the inner surface of the plates 27 at those locations, such cap-screws screwing into threaded holes through the channel-bars 126, 126 and reinforcements on the tractor mainframe 26, as shown most clearly in Figure 8.

To further connect the shovel-frame walls 27, 27 with the channel-bars 126 at other points 128, 128 comparable cap-screws and vertical slots or oversize holes are employed, as shown in Figure 4.

Inasmuch as the loaded shovel is well to the front of the tractor and since the oscillatory bars or cradles 24 and 29 are some substantial distance back thereof, under certain circumstances the shovel and its supporting framework may have a tendency to act as a lever and to ascend back of such cross-bars 24 and 29, and, therefore, to assist in holding such rear part of the structure down, its two side-walls or plates 27, 27 are provided with rearward extension plates reaching back to the points 34, 34 where their ends are bolted or otherwise fixedly secured to rigid parts of the tractor and to a cross-bar 35 (Figures 3 and 4).

From what precedes it should be clear that the weight of the shovel-frame and all that it carries is transmitted to the track or truck side-frames through the oscillatory-bar without being transmitted through any part of the engine-frame and all elements mounted thereon, such latter load being also conveyed through the same oscillatory-bar to the side-trucks.

Whereas various details of construction have been presented in the drawings and set forth in the above description, it is to be understood that various modifications may be resorted to without departure from the heart and essence of the invention as presented in the following claims and without the loss or sacrifice of any of its material or substantial benefits and advantages.

I claim:

1. In a crawler-tractor, the combination comprising a pair of truck frames, a transverse beam oscillatably mounted on and extending between said truck frames, a main tractor frame, a stud shaft mounted on the tractor frame and pivotally received and carried by said transverse beam, a shovel frame, a pair of cradles to which said shovel frame is attached, said cradles being disposed on opposite sides of said oscillatory beam and pivotally supported on said stud shaft separately from the main tractor frame.

2. In a tractor shovel, the combination comprising a pair of truck frames, endless tread mechanism mounted upon said truck frames, an axle interconnecting said truck frames at one end thereof, a transverse oscillatory beam mounted at its ends on said truck frames forwardly at said axle, a main tractor frame, a stud shaft carried by said main tractor frame and pivotally mounted on said transverse beam, and a shovel frame, said shovel frame being pivotally mounted upon said transverse beam separately from the main tractor frame whereby the load on said shovel frame is transmitted to said transverse beam vertically independent of said main tractor frame.

3. In a tractor shovel, the combination comprising a pair of truck frames, endless tread mechanism mounted upon said truck frames, an axle interconnecting said truck frames at one end thereof, a transverse oscillatory beam mounted at its ends on said truck frames, a main tractor frame, a stud shaft carried by said main tractor frame and pivotally mounted on said transverse beam, a shovel frame, said shovel frame being pivotally mounted upon said transverse beam whereby the load on said shovel frame is transmitted to said transverse beam vertically independent of said main tractor frame, and means connecting said main tractor frame and said shovel frame at a point adjacent said transverse beam, said connecting means permitting relative vertical movement between said main tractor frame and shovel frame but preventing horizontal movement therebetween.

4. In a tractor shovel, the combination comprising a pair of truck frames, endless tread mechanism mounted upon said truck frames, an axle interconnecting said truck frames at one end thereof, a transverse oscillatory beam mounted at its ends on said truck frames forwardly of said axle, a main tractor frame, a stud shaft carried by said main tractor frame and pivotally mounted on said transverse beam, a shovel frame, said shovel frame being pivotally mounted upon said transverse beam separately from the main tractor frame whereby the load on said shovel frame is transmitted to said transverse beam, and means rigidly connecting said main tractor frame and said shovel frame at a point adjacent said axle.

5. In a tractor shovel, the combination comprising a pair of truck frames, endless tread mechanism mounted upon said truck frames, an axle interconnecting said truck frames at one end thereof, a transverse oscillatory beam mounted on and extending between said truck frames forwardly of said axle, a main tractor frame, a stud shaft carried by said main tractor frame and pivotally mounted on said transverse beam, a shovel frame, said shovel frame being pivotally mounted upon said transverse beam separately from the main tractor frame whereby the load on said shovel frame is transmitted to said transverse beam, means connecting said main tractor frame and said shovel frame at a point adjacent said transverse beam, said connecting means permitting relative vertical movement between said main tractor frame and shovel frame but preventing horizontal movement therebetween, and means rigidly connecting said main tractor frame and said shovel frame at a point adjacent said axle.

6. In a crawler-tractor, the combination comprising a pair of truck frames, a transverse beam oscillatably mounted at its ends on said truck frames, a main tractor frame, a stud shaft pivotally connecting said transverse beam and said main tractor frame, a shovel frame having side members extending on opposite sides of said main tractor frame, a cross bar supporting at its ends the side members of said shovel frame and said cross bar being pivotally mounted on said stud shaft, said cross bar permitting the loads imposed on said main tractor frame and said side members of said shovel frame to be transmitted to said transverse beam separately of each other, and means rigidly connecting the rear of said shovel frame to said main tractor frame at a point spaced from the transverse beam.

7. In a tractor shovel, the combination comprising a pair of truck frames, endless tread mechanism mounted upon said truck frames, an axle interconnecting said truck frames at one end thereof, a transverse oscillatory beam mounted on the other end of said truck frames, a rounded top bearing block disposed between each end of the oscillatory beam and the corresponding truck frame, a main tractor frame, a stud shaft carried by said main tractor frame and pivotally mounted on said transverse beam, and a shovel frame, said shovel frame being pivotally mounted upon said transverse beam separately from the main tractor frame whereby the load on said shovel frame is transmitted to said transverse beam.

References Cited in the file of this patent

UNITED STATES PATENTS

| Number | Name | Date |
|---|---|---|
| 1,356,679 | Wickersham | Oct. 26, 1920 |
| 1,673,307 | Best | June 12, 1928 |
| 1,676,688 | Cummings | July 10, 1928 |
| 1,785,119 | Gorsuch et al. | Dec. 16, 1930 |
| 1,985,285 | Erdahl | Dec. 25, 1934 |
| 2,063,035 | Fuller et al. | Dec. 8, 1936 |
| 2,073,823 | Anthony | Mar. 16, 1937 |
| 2,126,289 | Schroeder | Aug. 9, 1938 |
| 2,269,775 | Le Bleu | Jan. 13, 1942 |
| 2,363,341 | Lawler | Nov. 21, 1944 |
| 2,377,495 | Hofmeister | June 5, 1945 |
| 2,427,968 | Hoover | Sept. 23, 1947 |
| 2,469,158 | De Frees | May 3, 1949 |
| 2,519,974 | Mork | Aug. 22, 1950 |
| 2,538,000 | Hoar et al. | Jan. 16, 1951 |